(12) United States Patent
Kimura

(10) Patent No.: US 10,885,761 B2
(45) Date of Patent: Jan. 5, 2021

(54) CALIBRATING A SENSOR SYSTEM INCLUDING MULTIPLE MOVABLE SENSORS

(71) Applicant: Magik Eye Inc., New York, NY (US)

(72) Inventor: Akiteru Kimura, Hachioji (JP)

(73) Assignee: Magik Eye Inc., New York, NY (US)

(*) Notice: Subject to any disclaimer, the term of this patent is extended or adjusted under 35 U.S.C. 154(b) by 116 days.

(21) Appl. No.: 16/150,512

(22) Filed: Oct. 3, 2018

(65) Prior Publication Data

US 2019/0108743 A1   Apr. 11, 2019

Related U.S. Application Data

(60) Provisional application No. 62/569,545, filed on Oct. 8, 2017.

(51) Int. Cl.
  *G08B 21/04* (2006.01)
  *G08B 21/02* (2006.01)
  (Continued)

(52) U.S. Cl.
  CPC ... *G08B 21/0476* (2013.01); *G08B 13/19645* (2013.01); *G08B 21/0261* (2013.01);
  (Continued)

(58) Field of Classification Search
  CPC .......... G08B 21/0476; G08B 13/19645; G08B 21/0261; G08B 21/22; G08B 29/20; H04N 7/188
  (Continued)

(56) References Cited

U.S. PATENT DOCUMENTS 4,914,460 A     4/1990 Caimi et al.
5,699,444 A  *  12/1997 Palm ..................... G01C 11/06
                                                            382/106
(Continued)

FOREIGN PATENT DOCUMENTS

CN   101794065 A   8/2010
CN   103196385 A   7/2013
(Continued)

OTHER PUBLICATIONS

International Search Report and Written Opinion mailed in corresponding PCT/US2018/054099 dated Jan. 31, 2019, 9 pages.

*Primary Examiner* — Kam Wan Ma
(74) *Attorney, Agent, or Firm* — Tong, Rea, Bentley & Kim, LLC

(57) ABSTRACT

In an example, an apparatus includes a first sensor, a second sensor, and an integrated management system. The first sensor is for capturing a first set images of a calibration target that is placed in a monitored site, wherein the first sensor has a first position in the monitored site, and wherein a physical appearance of the calibration target varies when viewed from different positions within the monitored site. The second sensor is for capturing a second set of images of the calibration target, wherein the second sensor has a second position in the monitored site that is different from the first position. The integrated management system is for determining a positional relationship of the first sensor and the second sensor based on the first set of images, the second set of images, and knowledge of the physical appearance of the calibration target.

20 Claims, 4 Drawing Sheets

(51) Int. Cl.
  *G08B 21/22* (2006.01)
  *G08B 29/20* (2006.01)
  *G08B 13/196* (2006.01)
  *H04N 7/18* (2006.01)

(52) U.S. Cl.
  CPC ............. *G08B 21/22* (2013.01); *G08B 29/20* (2013.01); *H04N 7/188* (2013.01)

(58) Field of Classification Search
  USPC ....................................................... 340/573.1
  See application file for complete search history.

(56) References Cited

U.S. PATENT DOCUMENTS

| | | | |
|---|---|---|---|
| 5,730,702 A | 3/1998 | Tanaka et al. | |
| 5,870,136 A * | 2/1999 | Fuchs | G01S 5/16 348/42 |
| 5,980,454 A | 11/1999 | Broome | |
| 6,038,415 A * | 3/2000 | Nishi | G03G 21/0064 399/111 |
| 6,442,476 B1 * | 8/2002 | Poropat | G01S 5/16 701/23 |
| 6,668,082 B1 * | 12/2003 | Davison | G06T 7/55 345/419 |
| 6,937,350 B2 | 8/2005 | Shirley | |
| 7,191,056 B2 * | 3/2007 | Costello | G01C 21/005 348/117 |
| 7,193,645 B1 * | 3/2007 | Aagaard | H04N 5/222 348/211.3 |
| 7,375,803 B1 | 5/2008 | Bamji | |
| 7,589,825 B2 * | 9/2009 | Orchard | G01S 17/46 356/4.01 |
| 9,098,909 B2 | 8/2015 | Nomura | |
| 9,488,757 B2 * | 11/2016 | Mukawa | G02B 3/12 |
| 9,686,539 B1 | 6/2017 | Zuliani et al. | |
| 9,888,225 B2 * | 2/2018 | Znamenskiy | H04N 13/20 |
| 9,986,208 B2 * | 5/2018 | Chao | G01C 21/20 |
| 10,386,468 B2 * | 8/2019 | Ryu | H04N 13/232 |
| 2003/0071891 A1 | 4/2003 | Geng | |
| 2004/0167744 A1 | 8/2004 | Lin et al. | |
| 2006/0044546 A1 * | 3/2006 | Lewin | G01S 17/46 356/4.04 |
| 2006/0055942 A1 | 3/2006 | Krattiger | |
| 2006/0290781 A1 | 12/2006 | Hama | |
| 2007/0091174 A1 | 4/2007 | Kochi et al. | |
| 2007/0165243 A1 | 7/2007 | Kang et al. | |
| 2007/0206099 A1 | 9/2007 | Matsuo | |
| 2010/0149315 A1 | 6/2010 | Qu et al. | |
| 2010/0223706 A1 * | 9/2010 | Becker | G10K 11/18 2/8.2 |
| 2010/0238416 A1 | 9/2010 | Kuwata | |
| 2011/0188054 A1 | 8/2011 | Petronius et al. | |
| 2012/0051588 A1 | 3/2012 | Mceldowney | |
| 2012/0056982 A1 | 3/2012 | Katz et al. | |
| 2012/0062758 A1 * | 3/2012 | Devine | H04W 4/024 348/222.1 |
| 2012/0113252 A1 | 5/2012 | Yang et al. | |
| 2012/0219699 A1 | 8/2012 | Pettersson | |
| 2012/0225718 A1 | 9/2012 | Zhang | |
| 2012/0236317 A1 | 9/2012 | Nomura | |
| 2013/0088575 A1 | 4/2013 | Park et al. | |
| 2013/0155417 A1 | 6/2013 | Ohsawa | |
| 2013/0242090 A1 | 9/2013 | Yoshikawa | |
| 2013/0307933 A1 * | 11/2013 | Znamenskiy | H04N 13/236 348/46 |
| 2014/0000520 A1 | 1/2014 | Bareket | |
| 2014/0009571 A1 | 1/2014 | Geng | |
| 2014/0016113 A1 | 1/2014 | Holt et al. | |
| 2014/0036096 A1 | 2/2014 | Sterngren | |
| 2014/0071239 A1 | 3/2014 | Yokota | |
| 2014/0085429 A1 | 3/2014 | Hérbert | |
| 2014/0125813 A1 | 5/2014 | Holz | |
| 2014/0207326 A1 | 7/2014 | Murphy | |
| 2014/0241614 A1 | 8/2014 | Lee | |
| 2014/0275986 A1 | 9/2014 | Vertikov | |
| 2014/0320605 A1 | 10/2014 | Johnson | |
| 2015/0009301 A1 | 1/2015 | Ribnick et al. | |
| 2015/0012244 A1 * | 1/2015 | Oki | G01S 17/08 702/159 |
| 2015/0077764 A1 | 3/2015 | Braker et al. | |
| 2015/0131054 A1 | 5/2015 | Wuellner et al. | |
| 2015/0160003 A1 | 6/2015 | Terry et al. | |
| 2015/0171236 A1 | 6/2015 | Murray | |
| 2015/0248796 A1 | 9/2015 | Iyer et al. | |
| 2015/0268399 A1 | 9/2015 | Futterer | |
| 2015/0288956 A1 | 10/2015 | Mallet et al. | |
| 2015/0323321 A1 | 11/2015 | Oumi | |
| 2015/0336013 A1 * | 11/2015 | Stenzler | A63G 31/00 700/90 |
| 2016/0022374 A1 | 1/2016 | Haider | |
| 2016/0117561 A1 | 4/2016 | Miyazawa et al. | |
| 2016/0128553 A1 | 5/2016 | Geng | |
| 2016/0178915 A1 | 6/2016 | Mor et al. | |
| 2016/0261854 A1 | 9/2016 | Ryu et al. | |
| 2016/0267682 A1 | 9/2016 | Yamashita | |
| 2016/0327385 A1 | 11/2016 | Kimura | |
| 2016/0328854 A1 | 11/2016 | Kimura | |
| 2016/0334939 A1 | 11/2016 | Dawson et al. | |
| 2016/0350594 A1 | 12/2016 | McDonald | |
| 2017/0098305 A1 | 4/2017 | Gossow | |
| 2017/0102461 A1 | 4/2017 | Tezuka et al. | |
| 2017/0221226 A1 | 8/2017 | Shen et al. | |
| 2017/0270689 A1 * | 9/2017 | Messely | G06T 7/80 |
| 2017/0284799 A1 | 10/2017 | Wexler et al. | |
| 2017/0307544 A1 | 10/2017 | Nagata | |
| 2018/0010903 A1 | 1/2018 | Takao et al. | |
| 2018/0011194 A1 | 1/2018 | Masuda et al. | |
| 2018/0073863 A1 | 3/2018 | Watanabe | |
| 2018/0080761 A1 | 3/2018 | Takao et al. | |
| 2018/0143018 A1 | 5/2018 | Kimura | |
| 2018/0156609 A1 | 6/2018 | Kimura | |
| 2018/0227566 A1 | 8/2018 | Price et al. | |
| 2018/0249142 A1 | 8/2018 | Hicks et al. | |
| 2018/0329038 A1 | 11/2018 | Lin et al. | |
| 2018/0357871 A1 * | 12/2018 | Siminoff | G08B 13/19619 |
| 2019/0107387 A1 | 4/2019 | Kimura | |
| 2019/0122057 A1 | 4/2019 | Kimura | |
| 2019/0295270 A1 | 9/2019 | Kimura | |
| 2019/0297241 A1 | 9/2019 | Kimura | |
| 2019/0377088 A1 | 12/2019 | Kimura | |
| 2020/0003556 A1 | 1/2020 | Kimura | |
| 2020/0051268 A1 | 2/2020 | Kimura | |
| 2020/0182974 A1 | 6/2020 | Kimura | |
| 2020/0236315 A1 | 7/2020 | Kimura | |

FOREIGN PATENT DOCUMENTS

| | | |
|---|---|---|
| CN | 103559735 A | 2/2014 |
| CN | 104160243 A | 11/2014 |
| EP | 0358628 A2 | 3/1990 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |
| JP | 4485365 B2 | 6/2010 |
| JP | 2010-256182 A | 11/2010 |
| JP | 2012-047500 A | 3/2012 |
| JP | 2014-020978 A | 2/2014 |
| JP | 2014-511590 A | 5/2014 |
| JP | 2014-122789 A | 7/2014 |
| JP | 6038415 B1 | 12/2016 |
| KR | 10-2013-0037152 A | 4/2013 |
| KR | 10-2015-0101749 A | 9/2015 |
| KR | 10-2016-0020323 | 2/2016 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO 2013/145164 A1 | 10/2013 |

(56) References Cited

FOREIGN PATENT DOCUMENTS

| WO | WO 2014/0106843 A2 | 7/2014 |
| WO | WO 2014/131064 | 8/2014 |
| WO | WO 2015/166915 A1 | 11/2015 |

* cited by examiner

400

CALIBRATING A SENSOR SYSTEM INCLUDING MULTIPLE MOVABLE SENSORS

CROSS REFERENCE TO RELATED APPLICATIONS

This application claims the priority of U.S. Provisional Patent Application Ser. No. 62/569,545, filed Oct. 8, 2017, which is herein incorporated by reference in its entirety.

BACKGROUND

Many workplaces and other locations may include areas where human access is restricted. For instance, a construction site or a factory may include one or more areas in which access is restricted to prevent individuals from encountering potentially hazardous or unsafe conditions. A government building may include one or more areas in which access is restricted to all individuals except for those with specific security clearances.

To continually monitor the restricted areas, a safety sensor system may be deployed. Conventional safety sensor systems include one or more cameras that are installed in fixed positions to capture images of a monitored area and its surroundings. An alert may be triggered if the images indicate that an unauthorized individual has been detected in the monitored area.

SUMMARY

In an example, an apparatus includes a first sensor, a second sensor, and an integrated management system. The first sensor is for capturing a first set images of a calibration target that is placed in a monitored site, wherein the first sensor has a first position in the monitored site, and wherein a physical appearance of the calibration target varies when viewed from different positions within the monitored site. The second sensor is for capturing a second set of images of the calibration target, wherein the second sensor has a second position in the monitored site that is different from the first position. The integrated management system is for determining a positional relationship of the first sensor and the second sensor based on the first set of images, the second set of images, and knowledge of the physical appearance of the calibration target.

In another example, a method includes acquiring a first set of images of a calibration target, wherein the first set of images was captured by a first sensor having a first position in a monitored site, and wherein a physical appearance of the calibration target varies when viewed from different positions within the monitored site, acquiring a second set of images of the calibration target, wherein the second set of images was captured by a second sensor having a second position in the monitored site, and identifying a positional relationship of the first sensor and the second sensor based on the first set of images, the second set of images, and knowledge of the physical appearance of the calibration target.

In another example, a non-transitory machine-readable storage medium is encoded with instructions executable by a processor, wherein, when executed, the instructions cause the processor to perform operations. The operations include acquiring a first set of images of a calibration target, wherein the first set of images was captured by a first sensor having a first position in a monitored site, and wherein a physical appearance of the calibration target varies when viewed from different positions within the monitored site, acquiring a second set of images of the calibration target, wherein the second set of images was captured by a second sensor having a second position in the monitored site, and identifying a positional relationship of the first sensor and the second sensor based on the first set of images, the second set of images, and knowledge of the physical appearance of the calibration target.

DETAILED DESCRIPTION

The present disclosure broadly describes an apparatus, method, and non-transitory computer-readable medium for calibrating a sensor system including multiple movable sensors. As discussed above, many workplaces and other locations may include areas where human access is restricted. To continually monitor the restricted areas, a safety sensor system may be deployed. Conventional safety sensor systems include one or more cameras that are installed in fixed positions to capture images of a monitored area and its surroundings. In some cases, however, the areas in which access is restricted may change from day-to-day. For example, the conditions on a construction site may be in constant change as construction progresses. Thus, conventional safety sensor systems with their fixed-position sensors may not provide the necessary flexibility to monitor a constantly changing Examples of the present disclosure provide a safety sensor system comprising a plurality of three-dimensional sensors whose positions (i.e., locations and/or orientations) may be moved dynamically, at any time, within a monitored site. Each of the sensors may transmit images of their respective field of view to a centralized integrated management system, which may correlate the images from the plurality of sensors to generate a complete view of the monitored site. Each time any one or more of the sensors is moved to a new position, the integrated management system may calibrate the safety sensor system to ensure proper correlation of the images from the plurality of sensors. Calibration may involve acquiring images of a calibration target from the plurality of sensors and determining the relative positions of the plurality of sensors from the images of the calibration target. To facilitate this determination, the calibration target may have a known physical appearance (e.g., shape, color, geometry, and/or dimensions), which may be irregular, asymmetrical, and/or non-uniform (i.e., the calibration target's shape, color, geometry, and/or dimensions may appear different when viewed from different vantage points or within different fields of view).

Within the context of the present disclosure, the "position" of a sensor is understood to indicate the location and/or orientation of the sensor within a monitored site (i.e., a site being monitored by a sensor system including the sensor).

The "location" of a sensor may refer to the sensor's linear position in a three-dimensional space, while the "orientation" of a sensor may refer to the sensor's angular position in the three-dimensional space.

Figure 1:
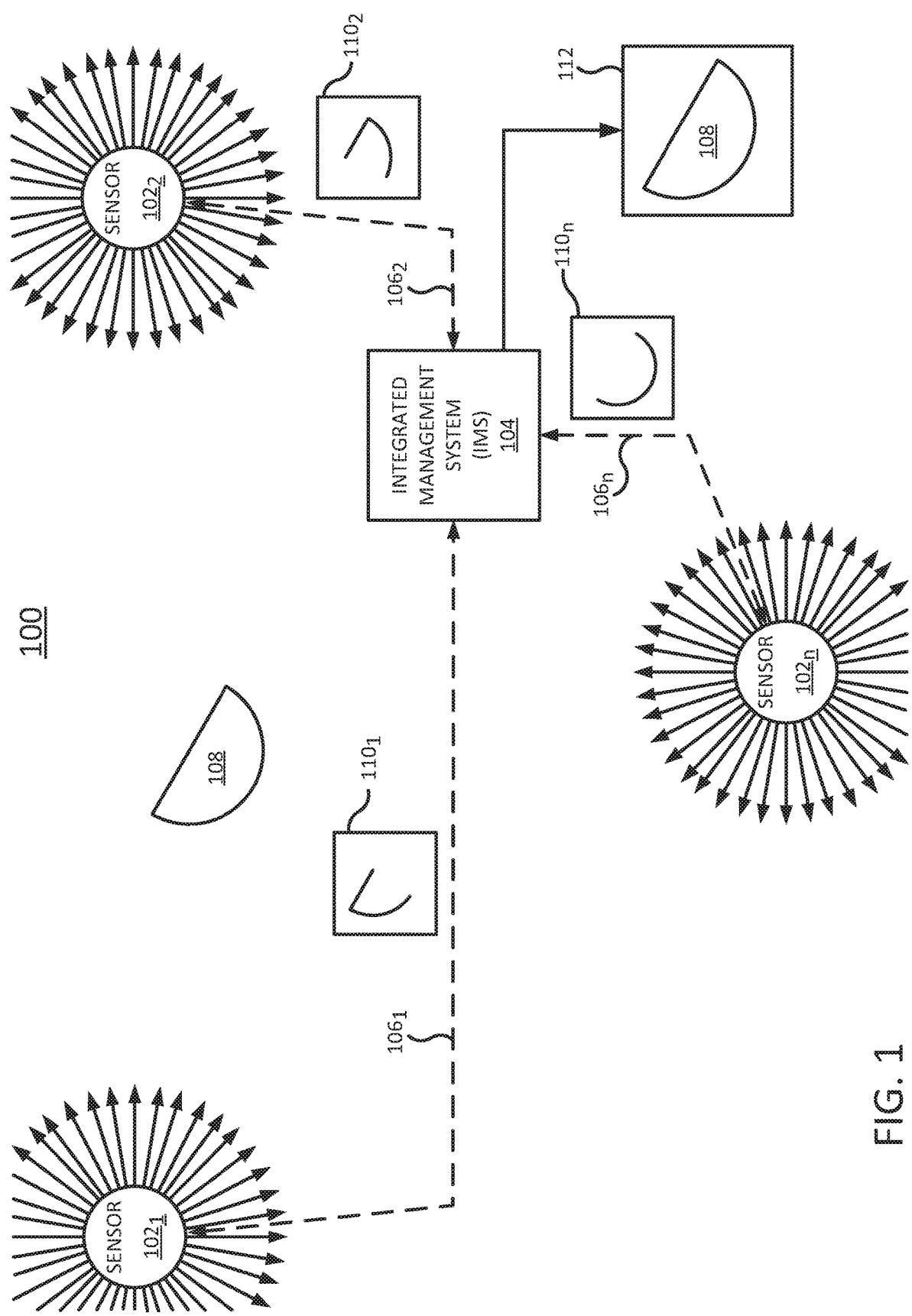
FIG. 1 depicts a high-level schematic diagram of an example safety sensor system 100 of the present disclosure.

FIG. 1 depicts a high-level schematic diagram of an example safety sensor system 100 of the present disclosure. As shown in FIG. 1, the safety sensor system 100 generally comprises a plurality of sensors $102_1$-$102_n$ (hereinafter individually referred to as a "sensor 102" or collectively referred to as "sensors 102") and an integrated management system (IMS) 104.

In one example, the plurality of sensors 102 includes at least two sensors (e.g., a first sensor $102_1$ and a second sensor $102_2$), which are distributed in different locations around a monitored site (e.g., a construction site, a factory, an office building, or the like). In one example, each of the sensors 102 may include a mount (e.g., a clamp) that allows the location of the sensor 102 to be moved by detachably mounting the sensor 102 to a support surface. Thus, the locations of the sensors 102 need not be permanently fixed. For instance, one or more of the sensors 102 could be mounted atop a traffic cone, or along a barrier or bar suspended between a pair of traffic cones, or along a construction pole (e.g., as might be used to block off restricted areas of a construction site). In another example, one or more of the sensors 102 could be mounted to a robot whose location and orientation is movable.

In one example, each of the sensors 102 is capable of collecting three-dimensional data about objects appearing within an at least hemispherical (i.e., 180 degree) field of view that represents a portion of the monitored site. For instance, one or more of the sensors 102 may comprise a sensor such as those described in U.S. patent application Ser. Nos. 14/920,246, 15/149,323, and/or 15/149,429, which are herein incorporated by reference in their entireties. The sensors described in these applications include lasers, diffractive optical elements, and/or other components which cooperate to project beams of light that create a pattern (e.g., a pattern of dots, dashes, or other artifacts) in a field of view. When the pattern is incident upon an object in the field of view, the distance from the sensor to the object can be calculated based on the appearance of the pattern (e.g., the trajectories of the dots, dashes, or other artifacts) in one or more images of the field of view.

Each of the sensors 102 may be communicatively coupled, via a respective wired or wireless connection $106_1$-$106_n$ (hereinafter individually referred to as a "connection 106" or collectively referred to as "connections 106"), to the IMS 104. Each of the sensors 102 may have its own unique identifier which is known to the IMS 104 and/or to the other sensors 102. [owls] The IMS 104 may comprise a computing system that is configured to integrate three-dimensional data (e.g., still and/or video images) received from the sensors 102. For instance, the IMS 104 may correlate images $110_1$-$110_n$ (hereinafter individually referred as an "image 110" or collectively referred to as "images 110") captured by the sensors $102_1$-$102_n$, respectively. The images 110 may all depict the same object 108, but from different vantage points that are functions of the different sensors' positions (i.e., locations and orientations). Each image 110 may also be associated with the identifier of the sensor 102 that captured the image 110, so that the IMS 104 may know from which location and orientation the image 110 was captured.

Proper correlation of the images 110 allows the IMS 104 to generate a single three-dimensional model 112 of the object 108 which includes the object's shape and position within the monitored site. Thus, this may allow the safety sensor system 100 to detect when an object (e.g., a vehicle, a person, an animal, or the like) is present in the monitored site. Additional processing (e.g., object recognition, facial recognition, and/or the like) may be employed to determine whether a detected object is authorized to be in the monitored site or not.

The IMS 104 may also control certain functions of the sensors 102 remotely. For instance, the IMS 104 may control the timing with which the sensors 102 activate lasers to project patterns of light into their respective fields of view (e.g., by sending signals to the sensors 102 to indicate when the lasers should be activated) and/or the timing with which the sensors 102 capture images. For instance, the IMS 104 may send a plurality of signals. Each signal may include an instruction to activate a laser and/or to capture an image, as well as an identifier identifying the sensor 102 that is to carry out the instruction. The IMS 104 may also send signals to the sensors 102 to control the positions of the sensors 102, e.g., in order to provide complete visual coverage of the monitored site.

Because the positions of the sensors 102 may be easily changed, the relative position of one sensor 102 to another sensor 102 may change frequently. As such, the IMS 104 may occasionally need to calibrate the safety sensor system 100 so that the positions of the sensors 102 relative to each other are known. As discussed above, knowing the relative positions of the sensors 102 is necessary to properly integrate the three-dimensional data received from the sensors 102. Calibration may be performed periodically (e.g., according to a defined and/or regular schedule), on-demand (e.g., in response to a command from a human operator), or in response to the occurrence of a predefined event (e.g., the movement of one or more sensors 102).

Figure 2:
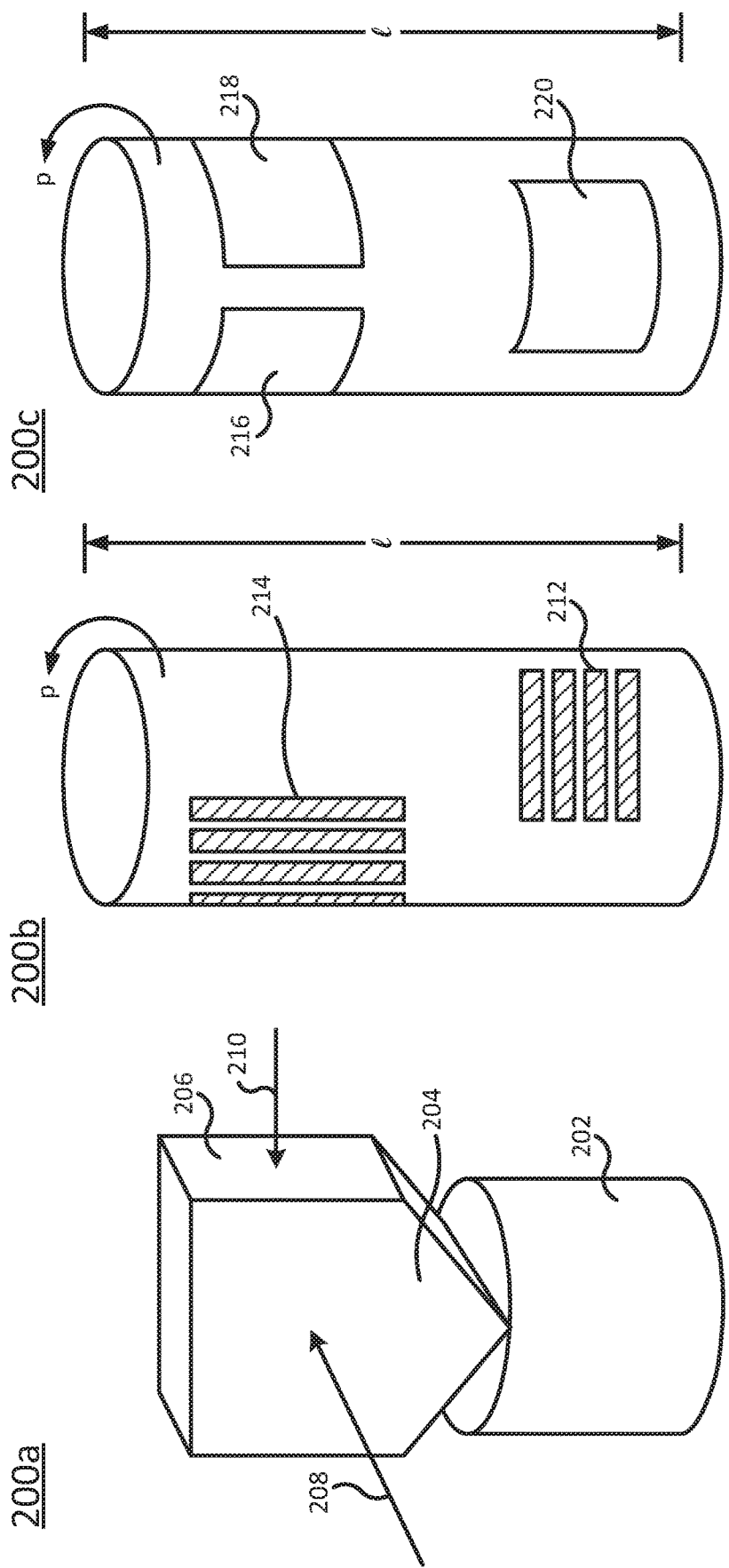
FIGS. 2A-2C illustrate various examples of calibration targets that may be used to calibrate the safety sensor system of FIG. 1.

In one example, calibration of the safety sensor system 100 is performed using a calibration target. FIGS. 2A-2C, for instance, illustrate various examples of calibration targets 200a-200c, respectively, that may be used to calibrate the safety sensor system 100 of FIG. 1. In one example, a calibration target according to the present disclosure is a physical article that may have a physical appearance (e.g., shape, color, geometry, and/or dimensions) which is irregular, asymmetrical, and/or non-uniform. In other words, the calibration target's shape, color, geometry, and/or dimensions may appear different when viewed from different vantage points or within different fields of view (e.g., by different sensors 102 of the safety sensor system 100).

For example, FIG. 2A illustrates a calibration target 200a having physical dimensions that are non-uniform. For instance, the calibration target 200a may include a plurality of connected segments that have different three-dimensional shapes. In the example illustrated in FIG. 2A, the calibration target 200a includes a first segment 202, a second segment 204, and a third segment 206. The first segment 202 has a cylindrical shape, the second segment 204 has a square pyramidal shape, and the third segment 206 has a cubical shape. Thus, when the calibration target 200a is viewed from different angles and/or directions (e.g., as shown by arrows 208 and 210), the physical appearance (e.g., shape, geometry, and/or dimensions) of the calibration target 200a may be different.

Although the calibration target 200a is illustrated as having three connected segments having cylindrical, pyramidal, and cubical shapes, it will be appreciated that the calibration target 200a could comprise any number of connected segments having any shapes. For instance, the calibration target 200a could comprise fewer than three connected segments, or more than three connected segments. Any one or more of the segments could have a shape that resembles a cylinder, a pyramid, a cube, a polygonal prism, or any other shape. Moreover, the shape of any given segment need not necessarily be symmetrical.

FIG. 2B illustrates a calibration target 200b displaying a non-uniform visual pattern. For instance, the calibration target 200b may include a plurality of patterned sections displaying different patterns. In the example illustrated in FIG. 2B, the calibration target 200b includes at least a first patterned section 212 and a second patterned section 214. The first patterned section 212 displays a series of horizontal bars, while the second patterned section 214 displays a series of vertical bars. The first patterned section 212 and the second patterned section 214 may be located on different portions of the calibration target 200b (e.g., at different locations around the periphery p of the calibration target 200b and/or at different locations along a length $\ell$ of the calibration target 200b). Thus, when the calibration target 200b is viewed from different angles and/or directions, the physical appearance (e.g., viewable portions of different patterns) of the calibration target 200b may be different.

It should be noted in the case of the calibration target 200b that the patterns displayed in the first patterned section 212 and the second patterned section 214 need not differ only in the shapes of the patterns (e.g., vertical versus horizontal bars). Alternatively or in addition, the patterns could vary in color (e.g., blue vertical bars versus red vertical bars). The shapes of the patterns could also be random or irregular. Moreover, although the angle of FIG. 2B shows two patterned sections (i.e., the first patterned section 212 and the second patterned section 214), the calibration target 200b may include any number of patterned sections. For instance, the calibration target 200b could comprise fewer than two patterned sections, or more than two patterned sections.

FIG. 2C illustrates a calibration target 200c displaying non-uniform reflective properties. For instance, the calibration target 200c may include a plurality of reflective sections having different reflective properties. In the example illustrated in FIG. 2C, the calibration target 200c includes at least a first reflective section 216, a second reflective section 218, and a third reflective section 220. The first reflective section 216, the second reflective section 218, and the third reflective section 220 may be treated (e.g., coated) to have different surface reflectances. For instance, the first reflective section 216 may be treated to exhibit diffuse reflectance, the second reflective section 218 and the third reflective section 220 may be treated to exhibit specular surface reflectance. The first reflective section 216, the second reflective section 218, and the third reflective section 220 may be located on different portions of the calibration target 200c (e.g., at different locations around the periphery p of the calibration target 200c and/or at different locations along a length $\ell$ of the calibration target 200c). Thus, when the calibration target 200c is viewed from different angles and/or directions, the physical appearance (e.g., surface reflectance) of the calibration target 200c may be different.

It should be noted in the case of the calibration target 200c that reflective sections need not differ only in terms of surface reflectance (e.g., specular versus diffuse). The degree to which the reflective sections exhibit specular or diffuse reflectance may also vary. Alternatively or in addition, the reflective sections could vary in shape (e.g., rectangular versus round or irregular). Moreover, although the angle of FIG. 2C shows three reflective sections, the calibration target 200c may include any number of reflective sections. For instance, the calibration target 200c could comprise fewer than three reflective sections, or more than three reflective sections.

In further examples, a calibration target may combine any two or more of the features shown in FIGS. 2A-2C. For instance, a single calibration target could include a combination of: (1) connected segments having different shapes; (2) different patterns or colors; and (2) patches having different reflective properties). Moreover, the calibration targets 200a-200c, or any calibration targets incorporating features of the calibration targets 200a-200c, may be fabricated from any type of material, including a metal, a polymer, a wood, a ceramic, a synthetic material, and/or a combination thereof.

A calibration target having different physical appearances when viewed from different angles (e.g., a first physical appearance when viewed from a first angle, a second physical appearance when viewed from a second, different angle, etc.), such as any of the calibration targets 200a-200c illustrated in FIGS. 2A-2C (or any combination thereof), can be used to calibrate a safety sensor system such as the system 100 illustrated in FIG. 1. As long as the physical appearance (including the size, color(s), geometry, and dimensions) of the calibration target is known prior to calibration, the relative positions of the sensors viewing the calibration target can be efficiently determined. The known physical appearance of the calibration target may be described in a three-dimensional model that is made available to the controller or IMS.

In particular, the calibration target may be placed in an arbitrary location in a monitored site, where the arbitrary location may be viewable by at least two sensors (e.g., a first sensor and a second sensor) of a safety sensor system. The arbitrary location may be constant or fixed in the monitored location, e.g., such that the location and orientation of the calibration target do not change until the calibration process is finished.

Once the calibration target is placed in its constant location, a first sensor (e.g., first sensor $102_1$ of FIG. 1) may capture a first set of images of the calibration target from a first position in the monitored site, while a second sensor (e.g., second sensor $102_2$ of FIG. 1) may capture a second set of images of the calibration target from a second position in the monitored site. Any additional sensors may capture additional sets of images of the calibration target from their respective positions in the monitored site. The first sensor and the second sensor (and any additional sensors) may send the sets of images to the IMS (e.g., IMS 104 of FIG. 1). The first sensor and the second sensor (and any additional sensors) may operate simultaneously to capture images of the calibration target, or the first sensor and second sensor (and any additional sensors) may operate one at a time (e.g., the second sensor may not begin capturing images until the first sensor is done capturing images).

The first set of images and the second set of images (and any additional sets of images) may be used by the IMS, along with the three-dimensional model of the calibration target, to determine the positions of the first and second sensors (and any additional sensors). One example of a method for determining the positions of the sensors using this information is described in greater detail with respect to FIG. 3.

Figure 3:
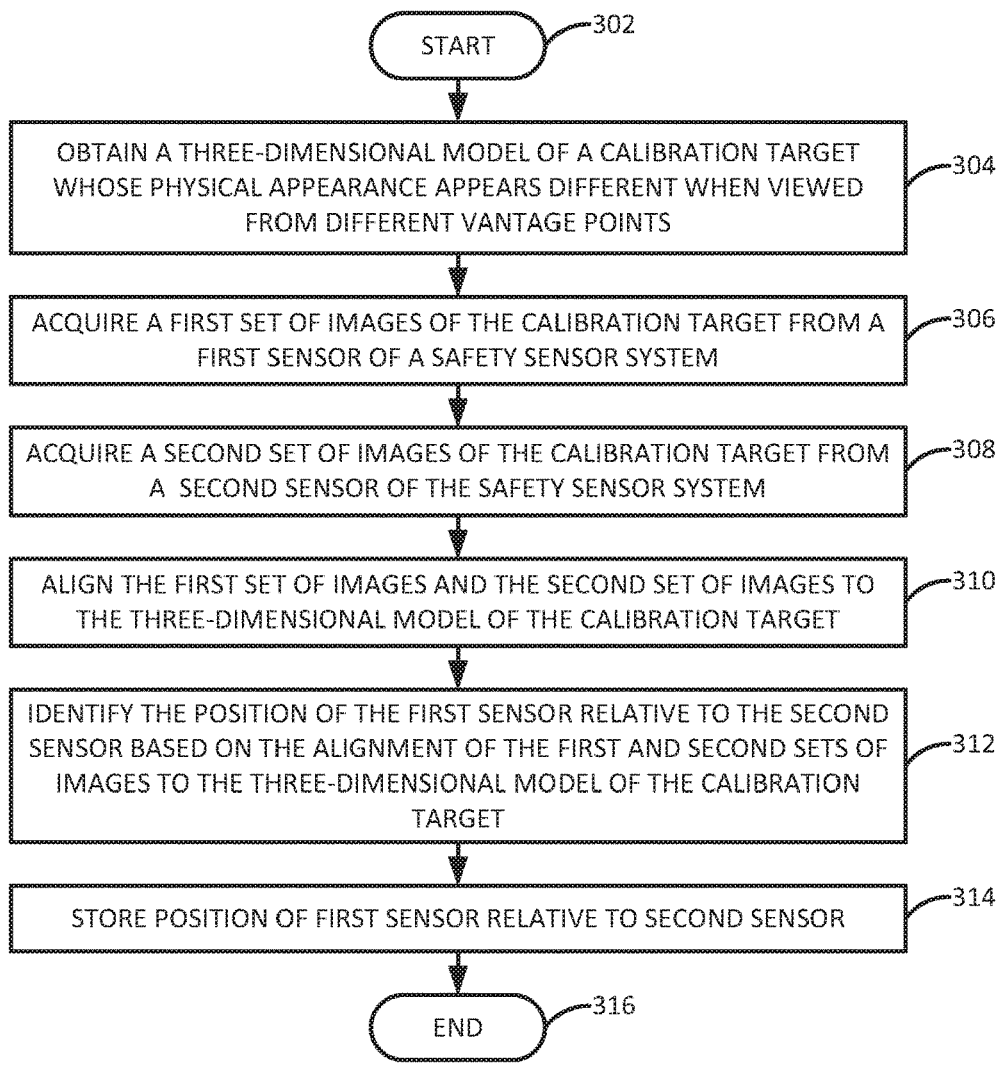
FIG. 3 illustrates a flow diagram of an example method for determining the positions of sensors in a safety sensor system including two or more sensors.

FIG. 3 illustrates a flow diagram of an example method 300 for determining the positions of sensors in a safety sensor system including two or more sensors. The method 300 may be performed, for example, by the IMS 104 of FIG. 1. As such, reference may be made in the discussion of the method 300 to components of the safety sensor system 100 of FIG. 1. However, such references are made for the sake of example only, and are not intended to be limiting.

The method 300 begins in block 302. In block 304, a three-dimensional model of a calibration target is obtained. The calibration target's physical appearance appears different when viewed from different vantage points of fields of view. For instance, the physical appearance of the calibration target may be non-uniform, asymmetrical, or irregular. The three-dimensional model describes the geometry and dimensions of the calibration target, as well as potentially other physical characteristics of the calibration target (e.g., color, size, etc.). The three-dimensional model may be obtained from computer-aided design data for the calibration target, from three-dimensional imaging of the calibration target (e.g., by the safety sensor system), or through other reliable means.

In block 306, a first set of images of the calibration target is acquired from a first sensor of a safety sensor system that is deployed in a monitored site. The calibration target may have been placed in an arbitrary location in the monitored site prior to the first sensor capturing the first set of images. The first sensor may have a first position in the monitored site. From this first position, the first sensor has a first field of view that allows the first sensor to capture images of the calibration target, where the images depict the physical characteristics of at least a portion of the calibration target. In one example, the first set of images may be sent to the IMS by the first sensor in response to the IMS sending a signal to the first sensor that instructs the first sensor to activate a laser and/or acquire an image. However, since the signal may not coincide precisely with the operation timing of the first sensor's image capturing unit, the actual timing of the laser activation and/or image capture may be adjusted relative to the timing of the signal.

In block 308, a second set of images of the calibration target is acquired from a second sensor of the safety sensor system that is deployed in the monitored site. The second sensor may have a second position in the monitored site that is different from the first position of the first sensor. From this second position, the second sensor has a second field of view that allows the second sensor to capture images of the calibration target, where the images depict the physical characteristics of at least a portion of the calibration target. The second field of view may or may not overlap with the first field of view. In one example, the second set of images may be sent to the IMS by the second sensor in response to the IMS sending a signal to the second sensor that instructs the second sensor to activate a laser and/or acquire an image. However, since the signal may not coincide precisely with the operation timing of the second sensor's image capturing unit, the actual timing of the laser activation and/or image capture may be adjusted relative to the timing of the signal.

In one example, the first set of images and the second set of images are acquired simultaneously from the first sensor and the second sensor; however, in another example, the first set of images and the second set of images are acquired at different times. However, the position of the calibration target remains constant and does not change between image capture by the first sensor and the second sensor.

In block 310, the first set of images and the second set of images are aligned to the three-dimensional model of the calibration target. For instance, the first set of images may be aligned to a first portion of the three-dimensional model that the first set of images most closely matches, while the second set of images may be aligned to a second portion of the three-dimensional model that the second set of images most closely matches. In one example, the first set of images and the second set of images may overlap. That is, certain portions of the calibration target may be depicted in both the first set of images and the second set of images (e.g., may be visible to both the first sensor and the second sensor).

In block 312, the position of the first sensor relative to the second sensor is identified based on the alignment of the first and second sets of images to the three-dimensional model of the calibration target.

In block 314, the position of the first sensor relative to the second is stored. In one example, storage of the first and second sensors' positional relationship involves storing the linear distance between the first and second sensors, the angles between optical axes of first and second sensors, and other statistics that describe the positional relationship.

The method 300 ends in block 316.

The method 300 may be repeated for additional pairs of sensors in the safety sensor system (e.g., if the safety sensor system includes more than two sensors). Once the relative positions of all of the sensors have been determined, the safety sensor system may be ready to monitor the monitored site. Knowing the respective positions of the sensors within the monitored site allows the safety sensor system to properly correlate images collected by the sensors into accurate three-dimensional models of objects that are present within the monitored site. For instance, the positional relationships of the sensors may be used to guide alignment of images collected from the sensors, which may depict the same object from various different angles or fields of view. As discussed above, once an accurate three-dimensional model of an object present within the monitored site is constructed, the model can be forwarded for further processing, such as object recognition, facial recognition, or the like.

It should be noted that although not explicitly specified, some of the blocks, functions, or operations of the method 300 described above may include storing, displaying and/or outputting for a particular application. In other words, any data, records, fields, and/or intermediate results discussed in the method 300 can be stored, displayed, and/or outputted to another device depending on the particular application. Furthermore, blocks, functions, or operations in FIG. 3 that recite a determining operation, or involve a decision, do not imply that both branches of the determining operation are practiced. In other words, one of the branches of the determining operation may not be performed, depending on the results of the determining operation.

Figure 4:
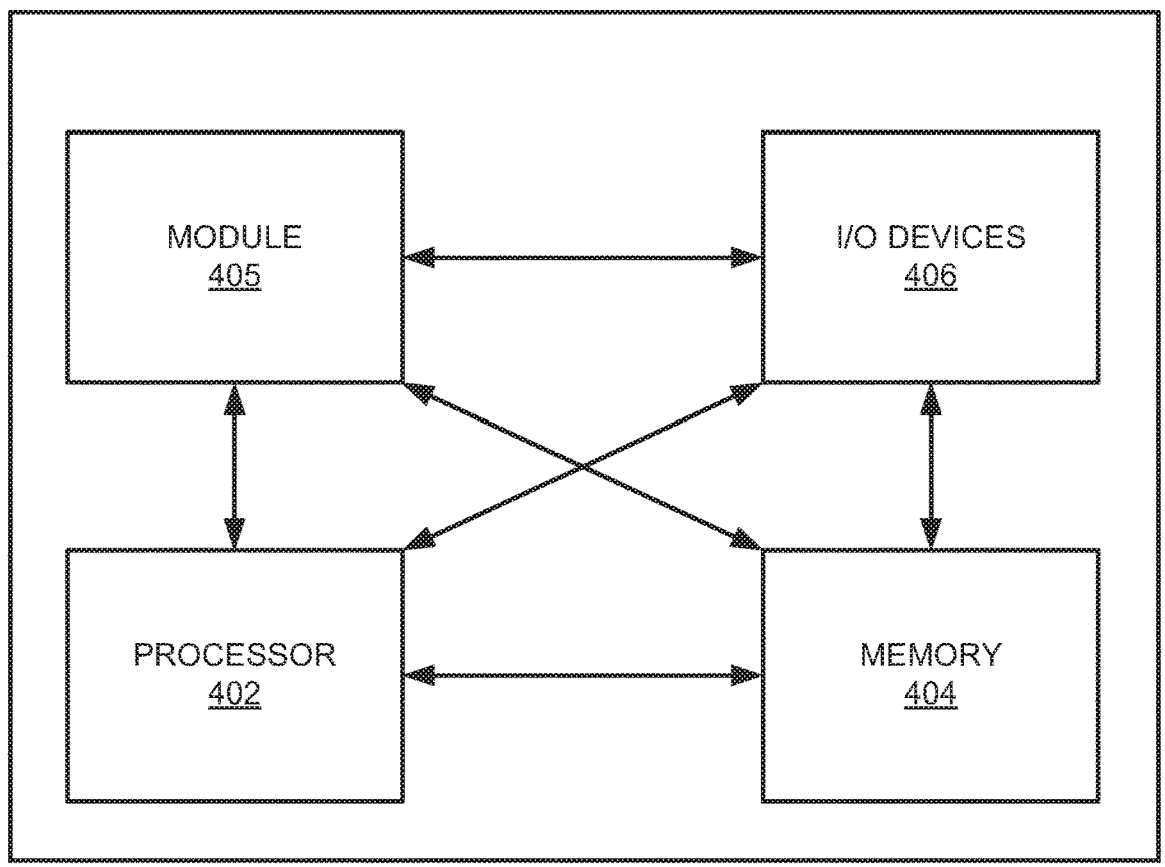
FIG. 4 depicts a high-level block diagram of an example electronic device for determining the positions of sensors in a safety sensor system including two or more sensors.

FIG. 4 depicts a high-level block diagram of an example electronic device 400 for determining the positions of sensors in a safety sensor system including two or more sensors. For instance, the IMS 104 illustrated in FIG. 1 may be configured in a manner similar to the electronic device 400. As such, the electronic device 400 may be implemented as a controller of an electronic device or system, such as a safety sensor system.

As depicted in FIG. 4, the electronic device 400 comprises a hardware processor element 402, e.g., a central processing unit (CPU), a microprocessor, or a multi-core processor, a memory 404, e.g., random access memory (RAM) and/or read only memory (ROM), a module 405 for determining the positions of sensors in a safety sensor system including two or more sensors, and various input/output devices 406, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, and the like.

Although one processor element is shown, it should be noted that the electronic device 400 may employ a plurality of processor elements. Furthermore, although one electronic device 400 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 400 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 405 for determining the positions of sensors in a safety sensor system including two or more sensors, e.g., machine readable instructions can be loaded into memory 404 and executed by hardware processor element 402 to implement the blocks, functions or operations as discussed above in connection with the method 300. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 405 for determining the positions of sensors in a safety sensor system including two or more sensors of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A system, comprising:
   a first sensor for capturing a first set images of a calibration target that is placed in a monitored site, wherein the first sensor has a first position in the monitored site, and wherein the calibration target has a physical appearance comprising:
      a first reflective section exhibiting first reflective properties; and
      a second reflective section displaying second reflective properties that are different from the first reflective properties,
      wherein the first reflective section and the second reflective section are located on different portions of a periphery of the calibration target, and wherein the first set of images depicts the first reflective section;
   a second sensor for capturing a second set of images of the calibration target, wherein the second sensor has a second position in the monitored site that is different from the first position, and wherein the second set of images depicts the second reflective section; and
   a processor for determining a positional relationship of the first sensor and the second sensor by aligning the first set of images and the second set of images with a three-dimensional model of the calibration target.

2. The system of claim 1, wherein the calibration target is placed in an arbitrary position within the monitored site.

3. The system of claim 1, wherein at least one of the first sensor and the second sensor is movable.

4. The system of claim 1, wherein the processor is further for generating a three-dimensional model of an object that is present within the monitored site, using images of the object captured by the first sensor and the second sensor.

5. The system of claim 1, wherein at least one of the first sensor and the second sensor has a field of view that is at least hemispherical.

6. The system of claim 1, wherein at least one of the first sensor and the second sensor included a laser light source to project a plurality of beams of light into a corresponding field of view, so that the plurality of beams of light create a pattern of artifacts in the field of view.

7. The system of claim 1, wherein the physical appearance of the calibration target includes non-uniform physical dimensions.

8. The system of claim 7, wherein the calibration target further comprises:
   a first segment having a first three-dimensional shape; and
   a second segment connected to the first segment and having a second three-dimensional shape that is different from the first three-dimensional shape.

9. The system of claim 1, wherein the physical appearance of the calibration target includes a non-uniform visual pattern.

10. The system of claim 9, wherein the calibration target further comprises:
    a first patterned section displaying a first pattern; and
    a second patterned section displaying a second pattern that is different from the first pattern,
    wherein the first pattern and the second pattern are located on different portions of a periphery of the calibration target.

11. The system of claim 1, wherein the first reflective section is treated with a coating that exhibits diffuse reflection and the second reflective section is treated with a coating that exhibits specular surface reflectance.

12. The system of claim 1, wherein the first reflective section is treated with a first coating, the second reflective section is treated with a second coating, and the first coating exhibits a greater degree of reflectance than the second coating.

13. The system of claim 1, wherein a shape of the first reflective section is different than a shape of the second reflective section.

14. A method, comprising:
    acquiring a first set of images of a calibration target, wherein the first set of images was captured by a first sensor having a first position in a monitored site, and wherein the calibration target has a physical appearance comprising:
- a first reflective section exhibiting first reflective properties; and
- a second reflective section displaying second reflective properties that are different from the first reflective properties,
- wherein the first reflective section and the second reflective section are located on different portions of a periphery of the calibration target, and wherein the first set of images depicts the first reflective section;

acquiring a second set of images of the calibration target, wherein the second set of images was captured by a second sensor having a second position in the monitored site, and wherein the second set of images depicts the second reflective section; and identifying a positional relationship of the first sensor and the second sensor by aligning the first set of images and the second set of images with a model of the calibration target.

15. The method of claim 14, wherein the calibration target is placed in an arbitrary position within the monitored site.

16. The method of claim 14, wherein the calibration target further comprises:
- a first segment having a first three-dimensional shape; and
- a second segment connected to the first segment and having a second three-dimensional shape that is different from the first three-dimensional shape.

17. The method of claim 14, wherein the calibration target further comprises:
- a first patterned section displaying a first pattern; and
- a second patterned section displaying a second pattern that is different from the first pattern,
- wherein the first pattern and the second pattern are located on different portions of a periphery of the calibration target.

18. The method of claim 14, wherein at least one of the first sensor and the second sensor is movable.

19. The method of claim 14, wherein at least one of the first sensor and the second sensor projects a plurality of beams of light into a corresponding field of view, so that the plurality of beams of light create a pattern of artifacts in the field of view.

20. A non-transitory machine-readable storage medium encoded with instructions executable by a processor, wherein, when executed, the instructions cause the processor to perform operations comprising:

acquiring a first set of images of a calibration target, wherein the first set of images was captured by a first sensor having a first position in a monitored site, and wherein the calibration target has a physical appearance comprising:
- a first reflective section exhibiting first reflective properties; and
- a second reflective section displaying second reflective properties that are different from the first reflective properties,
- wherein the first reflective section and the second reflective section are located on different portions of a periphery of the calibration target, and wherein the first set of images depicts the first reflective section;

acquiring a second set of images of the calibration target, wherein the second set of images was captured by a second sensor having a second position in the monitored site, and wherein the second set of images depicts the second reflective section; and identifying a positional relationship of the first sensor and the second sensor by aligning the first set of images and the second set of images with a model of the calibration target.

* * * * *

UNITED STATES PATENT AND TRADEMARK OFFICE
CERTIFICATE OF CORRECTION

Page 1 of 1

PATENT NO. : 10,885,761 B2
APPLICATION NO. : 16/150512
DATED : January 5, 2021
INVENTOR(S) : Akiteru Kimura It is certified that error appears in the above-identified patent and that said Letters Patent is hereby corrected as shown below:

On the Title Page

Item (56) Column 2, Line 2, delete "PCT/U52018/054099", and insert -- PCT/US2018/054099 --.

In the Specification

Column 3, Line 51, delete "102. [owls]", and insert -- 102. --.

Column 3, Lines 51-64, delete "The IMS 104 may comprise a computing system that is configured to integrate three-dimensional data (e.g., still and/or video images) received from the sensors 102. For instance, the IMS 104 may correlate images 1101-110n (hereinafter individually referred as an "image 110" or collectively referred to as "images 110") captured by the sensors 1021-102n, respectively. The images 110 may all depict the same object 108, but from different vantage points that are functions of the different sensors' positions (i.e., locations and orientations). Each image 110 may also be associated with the identifier of the sensor 102 that captured the image 110, so that the IMS 104 may know from which location and orientation the image 110 was captured.", and insert
-- The IMS 104 may comprise a computing system that is configured to integrate three-dimensional data (e.g., still and/or video images) received from the sensors 102. For instance, the IMS 104 may correlate images 1101-110n (hereinafter individually referred as an "image 110" or collectively referred to as "images 110") captured by the sensors 1021-102n, respectively. The images 110 may all depict the same object 108, but from different vantage points that are functions of the different sensors' positions (i.e., locations and orientations). Each image 110 may also be associated with the identifier of the sensor 102 that captured the image 110, so that the IMS 104 may know from which location and orientation the image 110 was captured. -- on Column 3, Line 52 as a new paragraph.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*